United States Patent [19]
Salzmann et al.

[11] Patent Number: 5,518,681
[45] Date of Patent: May 21, 1996

[54] METHOD AND APPARATUS FOR THE CROSS-SECTIONAL MEASUREMENT OF ELECTRIC INSULATED CONDUCTORS

[75] Inventors: Hannes Salzmann, Greppen; Ulrich Jung, Altdorf; Wilfried Kötter, Attinghausen, all of Switzerland

[73] Assignee: Zumbach Electronics AG, Switzerland

[21] Appl. No.: 260,166

[22] Filed: Jun. 15, 1994

Related U.S. Application Data

[63] Continuation of Ser. No. 865,398, Apr. 8, 1992, abandoned.

[30] Foreign Application Priority Data

Apr. 9, 1991 [CH] Switzerland ............... 01053/91

[51] Int. Cl.$^6$ ............... B29C 47/06; B29C 47/92
[52] U.S. Cl. ............... 264/408; 264/473; 264/488; 264/171.15; 264/171.17; 264/173.12; 264/174.11; 425/114; 425/141; 378/54
[58] Field of Search ............... 264/40.1, 40.2, 264/171, 174, 236, 408, 473, 488, 171.15, 171.17, 173.12, 174.11; 425/113, 114, 140, 141; 250/369; 378/54, 58

[56] References Cited

U.S. PATENT DOCUMENTS

| | | | |
|---|---|---|---|
| 3,187,071 | 6/1965 | Radziejowski | 264/174 |
| 3,479,446 | 11/1969 | Arnaudin, Jr. et al. | 264/174 |
| 3,502,752 | 3/1970 | Brown | 425/141 |
| 3,609,368 | 9/1971 | Knorr et al. | 378/54 |
| 3,796,874 | 3/1974 | Roller et al. | 378/54 |
| 4,137,028 | 1/1979 | Reitemeyer et al. | 425/141 |
| 4,259,281 | 3/1981 | Lanfranconi et al. | 425/404 |
| 4,585,407 | 4/1986 | Silver et al. | 425/114 |
| 4,605,525 | 8/1986 | Baxter | 425/140 |
| 4,708,837 | 11/1987 | Baxter et al. | 425/140 |
| 4,710,114 | 12/1987 | Garner | 425/141 |
| 4,719,061 | 1/1988 | Duffy | 264/40.2 |
| 4,732,722 | 3/1988 | Aida et al. | 425/113 |
| 4,997,995 | 3/1991 | Simmons et al. | 264/174 |
| 5,138,644 | 8/1992 | McArdle et al. | 378/54 |

FOREIGN PATENT DOCUMENTS

| | | |
|---|---|---|
| 0400310 | 12/1990 | European Pat. Off. . |
| 4-204205 | 7/1992 | Japan ............... 378/54 |
| 2145852 | 4/1985 | United Kingdom . |

*Primary Examiner*—Mathieu D. Vargot
*Attorney, Agent, or Firm*—Dilworth & Barrese

[57] ABSTRACT

A method and an apparatus for measuring an electric insulated conductor, in particular a medium-voltage and/or high-voltage insulated conductor, are proposed. Seen in profile cross-section, the insulated conductor (50) comprises a copper conductor, an inner semiconductor, an insulation and an outer semiconductor and is produced in an extrusion device (90) having an appropriately assigned crosslinking section (40). To achieve an even distribution of the two semiconductor layers and of the insulation layer, the insulated conductor (50) is radiated through immediately at the outlet from the crosslinking section (40) and a correction of the die setting in the extrusion device is carried out using the values thus determined.

3 Claims, 2 Drawing Sheets

METHOD AND APPARATUS FOR THE CROSS-SECTIONAL MEASUREMENT OF ELECTRIC INSULATED CONDUCTORS

This is a continuation of application Ser. No. 07/865,398 filed on Apr. 8, 1992, now abandoned.

BACKGROUND OF THE INVENTION

1. Field of the Invention

The invention relates to a method of measuring the cross-section of an electric insulated conductor, in particular a medium-voltage and/or high-voltage insulated conductor, as well as to an apparatus for carrying out the method, in which method/apparatus an inner semiconductor, an insulation and an outer semiconductor are applied to a copper conductor in an extrusion device provided with appropriate dies, and the individual layers of the insulated conductor are crosslinked in an appropriate installation.

2. Description of the Related Art

EP-A 0 400 310 discloses an apparatus for controlling the outside diameter of an insulated conductor, in which apparatus the outside diameter of the plastics strand emerging from the extruder is measured by means of a first measuring device immediately following the extruder and by a second measuring device following a cooling section and the actual diameter determined by this way of measuring is compared with the set diameter. A signal is formed from the difference values and this signal is used for controlling the speed of the extruder or for controlling the take-off rate of the plastics strand emerging from the extruder. With the known apparatus, only the outer diameter is measured and, in the event of any deviations, the extruder corrected correspondingly.

EP-A 0 387 508 discloses an apparatus for vulcanising or crosslinking an insulated conductor strand, which apparatus essentially comprises a tubular body which is designed with an inspection-glass fitting and essentially forms the heating and cooling zone.

SUMMARY OF THE INVENTION

With current requirements for such insulated conductors, but in particular in the case of medium-voltage and high-voltage insulated conductors having a plurality of plastic layers surrounding a copper conductor, it is necessary that, on the one hand, the copper conductor is arranged centrally in the insulated conductor and, on the other hand, the individual plastic layers have minimum possible difference in thickness over the circumference of the insulated conductor, i.e. that the individual layers are evenly distributed on the finished insulated conductor.

The invention is therefore based on the object of providing a method and an apparatus for carrying out the method by which an exact measurement of the thickness of the plastic layer and determination of the centricity of the copper conductor can be carried out.

This object is achieved by the method according to the invention in that the individual semiconductor and insulation layers of the insulated conductor emerging from the extrusion device are radiated through in at least two directions oriented orthogonally to the insulated conductor axis to determine intensity values and the values thus determined are used by a computer for correction of the individual layer thicknesses of the two semiconductors and of the insulation.

By the method according to the invention, in addition to the absorption values determined, undesired impurities or inhomogeneities of the layers passed through by the beams can also be detected, so that at the same time optimal quality assurance can also be achieved thereby.

The apparatus for carrying out the method comprises an extrusion device and an assigned crosslinking device, the extrusion device comprising at least one extruder head, which is provided with settable dies and by means of which an insulated conductor which is formed by at least one copper conductor, an inner semiconductor, an insulation and an outer semiconductor and is thermally crosslinked in the crosslinking device is produced, wherein a movable first measuring device passing a radiation through the individual layer thicknesses of the two semiconductors and of the insulation is arranged immediately downstream, in the through-running direction, of the extruder head applying the outer semiconductor.

BRIEF DESCRIPTION OF THE DRAWINGS

Further features of the invention emerge from the following description in conjunction with the drawing and the further patent claims.

The invention is described below with reference to the drawing, in which.

DESCRIPTION OF THE PREFERRED EMBODIMENT(S)

Figure 1:
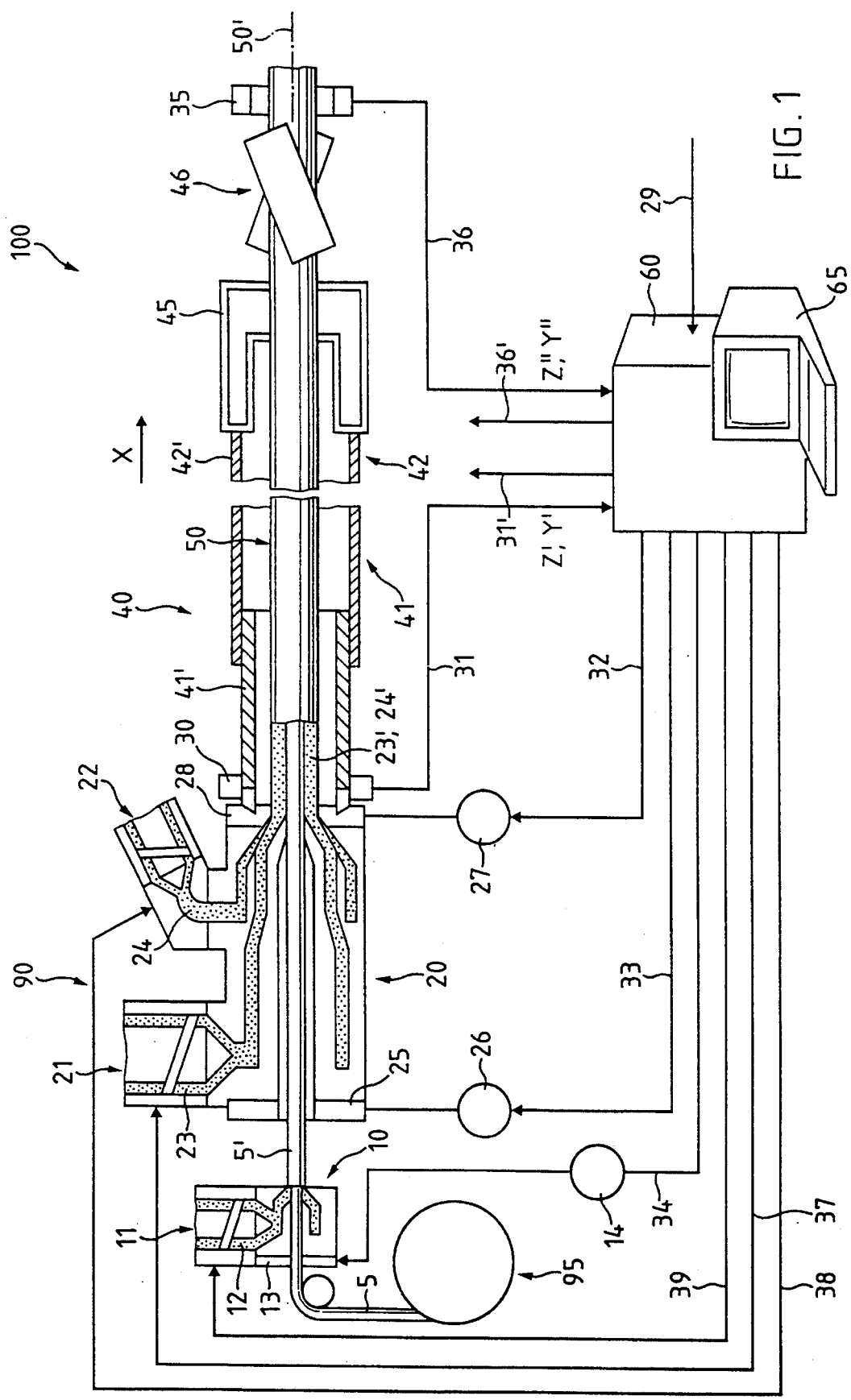
FIG. 1 shows a part, represented as a block diagram, of an installation for producing medium-voltage and/or high-voltage insulated conductors.

FIG. 1 shows a diagrammatically represented installation 100 for producing insulated conductors, in particular for producing medium-voltage and/or high-voltage insulated conductors. Such installations are known per se as so-called continuous vulcanisation installations (CV installation).

The installation 100, represented as an exemplary embodiment, essentially comprises an unwinding station 95, a single extruder head 10 and a double extruder head 20, a so-called crosslinking section 40 with appropriately assigned tube-end sealing device 45, a twisting caterpillar 46 and a winding station (not shown). The extruder heads 10, 20 together form an extrusion device 90, it being possible however, for the two extruder heads 10 and 20 to be designed as one unit, i.e. as a triple or multiple extruder head.

In the installation 100, a copper conductor 5 is drawn off from the unwinding station 95 by means of appropriately arranged and designed deflecting stations (not shown) and fed to the first extruder head 10 by means which are not shown.

The diagrammatically represented first extruder head 10 comprises a first extruder, denoted by 11, which is in effective connection with an appropriately assigned centering device 13 and is designed for applying inner semiconductor granules 12 to the copper conductor 5. When it leaves the first extruder head 10, the copper conductor 5', provided with the inner semiconductor 2 (FIG. 3), is fed to the double extruder head 20.

The double extruder head 20 comprises a second extruder 21, which is in effective connection with an appropriately assigned centering device 25 and is designed for applying insulation granules 23 to the copper conductor 5' provided with the inner semiconductor 2.

Subsequently or at the same time, appropriate outer semiconductor granules 24 are applied to the copper conductor 5', provided with the insulation granules 23, by an appropriately assigned third extruder 22 of the double extruder head 20. The third extruder 22 is effectively connected to an appropriately assigned centering device 28.

For setting and controlling the centering to be performed for applying the corresponding granules, the centering device 13 of the first extruder head 10 is in effective connection with a servomotor 14 and the centering device 25 of the double extruder head 20 is in effective connection with a servomotor 26 and the centering device 28 is in effective connection with a servomotor 27.

The insulated conductor 50, provided with the individual layers and emerging from the double extruder head 20 of the extrusion device 90 is in this case measured by means of an appropriately arranged first measuring device 30 with respect to the individual layer thicknesses and is subsequently passed through the crosslinking section, denoted overall by 40.

Figure 2:
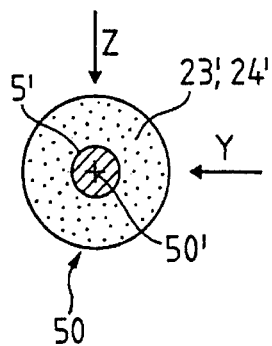
FIG. 2 shows an insulated conductor, represented diagrammatically and in profile cross-section, to explain the X-ray beams directed at it.

In FIGS. 1 and 2, the insulation and semiconductor granules applied to the copper conductor 5' upstream of the crosslinking section 40 are denoted by 23' and 24'.

The crosslinking section 40, known per se and diagrammatically represented, essentially comprises a first tubular body 41' and a second tubular body 42', seen in the production and running-through direction X. Arranged on the tubular body 42' on the side opposite the extruder device 20 is the tube-end sealing device 45.

The two tubular bodies 41', 42' are telescopically connected to each other, there essentially being arranged in the tubular body 42' a heating section, denoted overall by 41, and a cooling section, denoted overall by 42. A thermally activated crosslinkage, i.e. a chemical bonding of the molecular chains of the insulation material and also of the semiconductor materials, takes place in the heating section 41 at about the order of 200° C. The insulated conductor 50 is appropriately cooled in the cooling section 42.

For technical production reasons, pressurised nitrogen or steam is introduced into the tubular bodies 41', 42', sealed off at both ends, the pressure prevailing in the tubular bodies 41', 42' preferably being of the order of 10 to 15 bar.

By means of the appropriately assigned twisting caterpillar 46, for technical production reasons the insulated conductor 50 is twisted in a way known per se essentially over the entire length of the crosslinking section 40.

The insulated conductor 50 emerging from the crosslinking section subsequently runs through a second measuring device 35, by means of which any eccentricity of the insulated conductor 50 is determined.

The measuring device 30, diagrammatically represented in FIG. 1, is essentially based on the X-ray technique known per se and is preferably adjustable and fixable with respect to the insulated conductor 50 in the circumferential direction of the insulated conductor 50 by means of which are not shown.

The measuring device 30 is designed in such a way that at least one X-ray beam, preferably a focused X-ray beam, is directed orthogonally to the insulated conductor axis 50' and the actual measuring device 30 can also be displaced parallel to the insulated conductor axis 50', as a result of which optimal radiation through the individual layers is achieved.

In the case of a preferred design, a first focused X-ray beam is directed from a transmitting device (not shown) of the measuring device 30 as shown in FIG. 2 in the direction of arrow Z, for example orthogonally to the insulated conductor axis 50', and a second X-ray beam, oriented at right angles thereto, is directed in the direction of arrow Y to the insulated conductor axis 50' and are in each case sensed by an appropriately assigned receiver device (not shown).

In order that the entire cross-section of the insulated conductor can be sensed, the measuring device 30 comprising the transmitter and receiver is displaced parallel to the insulated conductor axis 50'. The measurement in the direction of arrow Z and at right angles thereto in the direction of arrow Y can be carried out at any points in the circumferential direction of the insulated conductor 50.

Values Z' and Y', referred to the correspondingly measured wall thicknesses of the individual layers, are fed from the measuring device 30 via a line 31 to a computer 60 and are processed to form corresponding signals. Values Z", Y", referred to the eccentricity of the layers, are fed from the second measuring device 35 via a line 36 to the computer 60 and processed to form corresponding signals and displayed, for example on a monitor 65. The one measuring device 30 is appropriately activated by the computer 60 via a line 31' and the other measuring device 35 is appropriately activated by the computer 60 via a line 36'.

By means of a suitable computer program, certain set-value signals are generated with regard to the wall thickness and eccentricity for correction of the dies provided in the extruder heads 10, 20 and are fed via a line 32 to the second servomotor 27, in effective connection with the centering device 28, and/or via a line 33 to the servomotor 26, in effective connection with the centering device 25, and/or via a line 34 to the servomotor 14, in effective connection with the centering device 13.

Appropriate data are fed via a line 29 to the computer 60 for setting the entire installation 100. For speed control, appropriate set-value signals are fed from the computer 60 via a line 39 to the extruder 11, via a line 37 to the extruder 21 and via a line 38 to the extruder 22.

Figure 3:
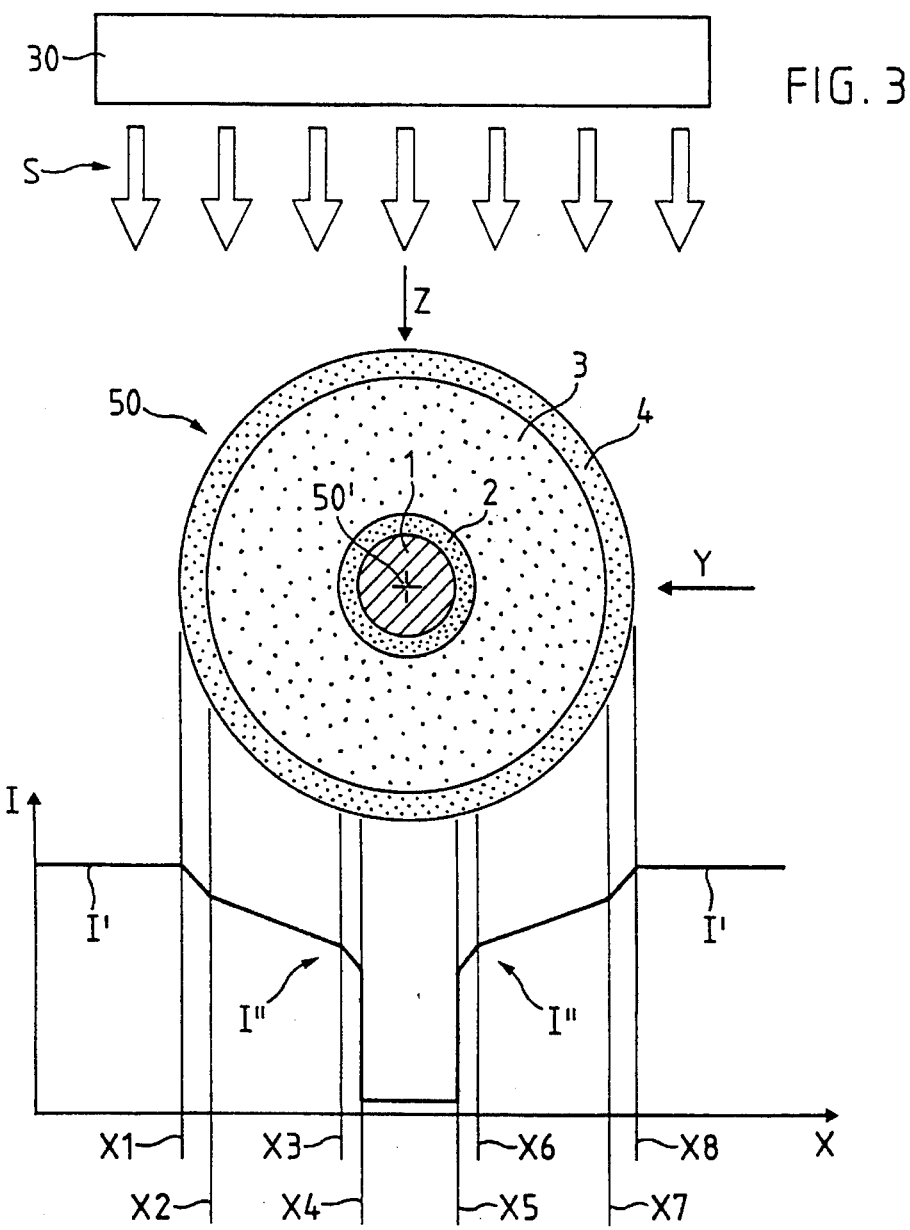
FIG. 3 shows an insulated conductor, represented on an enlarged scale and in profile cross-section, with graphic representation of correspondingly determined absorption intensity values.

FIG. 3 shows, on an enlarged scale and in profile cross-section, the insulated conductor 50, essentially comprising the copper conductor 1, the inner semiconductor 2, the insulation 3 and the outer semiconductor 4, with the appropriately assigned, diagrammatically represented measuring device 30.

In the exemplary embodiment represented, a number of beams S, which are directed in the direction of arrow Z orthogonally to the insulated conductor axis 50' and correspondingly penetrate the individual semiconductor and insulating layers 2, 3 and 4 of the insulated conductor 50, are emitted by the measuring device 30, provided with a transmitting device (not shown) and a receiver device.

In the graphic representation, a beam intensity is denoted by the coordinate I and a distance coordinate is denoted by X. The magnitude of the beam intensity (ahead of the insulated conductor 50) emitted by the transmitting device is denoted by I'.

The magnitude of the beam intensity (after the insulated conductor 50) reduced by the respective semiconductor and insulation layer and recorded by the receiver device is denoted by I".

In FIG. 3, the measuring variables resulting from the beam intensities correspondingly absorbed by the semiconductor and insulation layers 2, 3 and 4 as well as by the copper conductor 1 are specified by X1, X2, X3, X4, X5, X6, X7 and X8.

At this point it is pointed out that the radiation through the insulated conductor 50 orthogonally to the insulated conductor axis 50' in the circumferential direction of the insulated conductor 50 can be performed at any point, as represented in FIG. 3 by the direction of arrows Z and Y. Through-radiation may be performed with focused and with fanned beams, it being possible for measuring of the beams to take place at a point, on a line or else on a surface.

Passing radiation through by means of an appropriately designed X-ray detector system (X-ray device) is a preferred application, it likewise being possible for other beam systems and beam sources to be used.

We claim:

1. Apparatus for measuring the cross-section of an electric insulated conductor having individual layers in which an inner semiconductor (2), an insulation (3) and an outer semiconductor (4) are applied to a copper conductor (1) in an extrusion device provided with dies, and the individual layers of the insulated conductor (50) are then crosslinked, wherein the semiconductor layers and insulation layer of the insulated conductor (50) emerging from the extrusion device are radiated through in at least two directions oriented orthogonally to an insulated conductor axis (50') to determine intensity values which are used for correction of the individual layer thicknesses of the two semiconductor layers (2,4) and of the insulation layer (3), the apparatus comprising an extrusion device and a crosslinking device, the extrusion device (90) having at least one extruder head with settable dies to form the insulated conductor (50) constructed of at least one copper conductor (1), an inner semiconductor (2), an insulation (3) and an outer semiconductor (4), the insulated conductor (50) being thermally crosslinked in the crosslinking device (40); wherein a first measuring device (30) which passes radiation with a focused beam through the individual layer thicknesses of the two semiconductors (2,4) and of the insulation (3) is arranged immediately downstream, in the through-running direction, of the extruder head (20) applying the outer semiconductor (4); and wherein a second measuring device (35) for determining eccentricity, is arranged at a distance from the first measuring device (30) downstream of the crosslinking device (40).

2. Apparatus for extruding insulated electric conductors, including at least one extruder head for applying an insulator on a copper conductor and a device for curing said conductor after extrusion onto said copper conductor; said apparatus comprising:

a first measuring device positioned adjacent said extruder head including means for transmitting radiation through said insulator and said copper conductor, and means for receiving said radiation passing through said insulator and said cooper conductor;

a second measuring device positioned adjacent said curing device downstream from said extruder head, said first measuring device and said curing device, said second measuring device including means for transmitting radiation through said insulator and said cooper conductor, and means for receiving said radiation passing through said insulator and said copper conductor;

said first and second measuring devices determining the cross-sectional thickness of said insulator;

comparing means associated with said first and second measuring devices for comparing said determined cross-sectional thickness with a predetermined cross-sectional thickness; and adjusting means associated with said extruder head for adjusting said extruder head to vary the extrusion of said insulator onto said copper conductor to cause said determined cross-sectional thickness to equal said predetermined cross-sectional thickness.

3. Method for measuring the cross-section of an electric insulated conductor during extrusion and curing of at least one insulator onto a copper conductor of said electric insulated conductor comprising the steps of:

radiating at a first location through the electric insulated conductor as it exits from an extruder apparatus;

radiating at a second location through the electric insulated conductor as it exits from a curing apparatus downstream from said extruder apparatus;

measuring radiation intensity values passing through said electric insulated conductor at said first and second locations;

comparing said measured radiation intensity values to a predetermined value; and adjusting said extruder apparatus to cause said measured intensity values to equal said predetermined value.

* * * * *